United States Patent [19]

Kobayashi

[11] Patent Number: 5,225,289

[45] Date of Patent: Jul. 6, 1993

[54] OPTO-MAGNETIC RECORDING MEDIUM HAVING PLURALITY OF EXCHANGE-COUPLED MAGNETIC LAYERS

[75] Inventor: Tadashi Kobayashi, Tokyo, Japan

[73] Assignee: Canon Kabushiki Kaisha, Tokyo, Japan

[21] Appl. No.: 829,540

[22] Filed: Feb. 3, 1992

Related U.S. Application Data

[63] Continuation of Ser. No. 574,504, Aug. 27, 1990, abandoned, which is a continuation of Ser. No. 235,284, Aug. 23, 1988, abandoned.

[30] Foreign Application Priority Data

Aug. 25, 1987 [JP] Japan .................. 62-209299

[51] Int. Cl.$^5$ .................. H01F 10/06; H01F 10/16
[52] U.S. Cl. .................. 428/611; 428/678; 428/681; 428/627
[58] Field of Search ............... 428/611, 621, 623, 627, 428/678, 679, 681, 928

[56] References Cited

U.S. PATENT DOCUMENTS

| | | | |
|---|---|---|---|
| 4,710,434 | 12/1987 | Sato et al. | 428/678 |
| 4,727,005 | 2/1988 | Sato et al. | 428/678 |
| 4,753,853 | 6/1988 | Sato et al. | 428/679 |
| 4,777,082 | 10/1988 | Ishizaki et al. | 428/678 |
| 4,799,114 | 1/1989 | Tsunashima | 360/135 |
| 4,842,956 | 6/1989 | Kobayashi | 428/928 |

FOREIGN PATENT DOCUMENTS

| | | |
|---|---|---|
| 0225141 | 6/1987 | European Pat. Off. . |
| 3619618 | 11/1986 | Fed. Rep. of Germany . |
| 0177455 | 9/1985 | Japan . |
| 177455 | 11/1985 | Japan . |

OTHER PUBLICATIONS

Patents Abstracts of Japan, vol. 10, No. 300 (1986) 162 P 506, 61-117747.
Patent Abstracts of Japan, vol. 8, No. 92 (1984) 14 P 271, 59-5450.
J. Mag. Soc. J., vol. 11, Supp., No. S1 (1987) 329:32.

*Primary Examiner*—George Wyszomierski
*Attorney, Agent, or Firm*—Fitzpatrick, Cella, Harper & Scinto

[57] ABSTRACT

There is disclosed an opto-magnetic recording medium which comprises a substrate, a first magnetic layer of a Gd-Fe-Co amorphous alloy formed on the substrate and having iron group sublattice magnetization superiority, saturated magnetization of which falls within the range of 25 to 125 emu/cm$^3$, and a second magnetic layer of an R-Fe-Co (wherein R is at least one element selected from the group consisting of Tb and Dy) amorphous alloy having a higher coercive force than that of the first magnetic layer, a lower Curie point than that, and rare earth group sublattice magnetization superiority, saturated magnetization of which falls within the range of 25 to 175 emu/cm$^3$, and in which second magnetic layer is exchange-coupled with the first magnetic layer.

7 Claims, 6 Drawing Sheets

OPTO-MAGNETIC RECORDING MEDIUM HAVING PLURALITY OF EXCHANGE-COUPLED MAGNETIC LAYERS

This application is a continuation of application Ser. No. 574,504 filed on Aug. 27, 1990, now abandoned, which is a continuation of application Ser. No. 235,284, filed on Aug. 23, 1988, now abandoned.

BACKGROUND OF THE INVENTION

Field of the Invnetion

The present invention relates to an opto-magnetic recording medium used for an opto-magnetic memory and the like and, more specifically, to an opto-magnetic recording medium capable of thermo-magnetically recording data by radiation of light beams and reading out recorded data by using a magneto-optical effect.

Related Background Art

There are already known magnetooptical information recording media utilizing a polycrystalline thin layer, for example, of MnBi or MnCuBi, an amorphous thin layer, for example, of GdCo, GdFe, TbFe, DyFe, GdTbFe or TdByFe, or a crystalline thin layer, for example, of GIG. Among these materials, a thin layer of rare earth iron group amorphous alloys is recently considered adequate for producing a magnetooptical information recording medium, in consideration of ease of producing a thin layer of a large area at a temperature close to the normal temperature.

In general, the magnetooptical information recording medium is required to show a high recording sensitivity, a large magnetooptical effect and a high coercive force. However it has been difficult to meet all these requirements with any of the above-mentioned thin layers alone. Fcr example GdCo or GdFe, allowing compensation point recording, shows a large magneto-optical effect at information reading and provides a high S/N ratio due to a relatively high Curie temperature, but shows a low coercive force so that the recorded domans are unstable. On the other hand, TbFe or DyFe allowing Curie point recording is not associated with the above-mentioned drawbacks because of a relatively high coercive force, but provides a low S/N ratio at information reading due to the low Curie temperature. In order to avoid these drawbacks, U.S. Pat. No. 4,799,114 to Tsunashima, issued Jan. 17, 1989, for example, teaches a magnetooptical information recording medium of a two-layered structure. This recording medium comprises a perpendicularly magnetizable high-coercive force layer having a low Curie point and a perpendicularly magnetizable low-coercive force layer having a high Curie point. The high-coercive force layer is exchange-coupled with the low-coercive force layer. Information is recorded and stored in the high-coercive force layer having the low Curie point. The recorded information is transferred to the low-coercive force layer. The stored information is read out from the low-coercive force layer having the high Curie point and a high opto-magnetic Kerr rotational angle.

U.S. Pat. No. 4,753,853 proposes an opto-magnetic recording medium wherein a rare earth-iron amorphous alloy having iron group sublattice magnetization superiority is used to form a high-coercive force layer, a rare earth-iron amorphous alloy also having iron group sublattice magnetization superiority is used to form a low-coercive force layer, and directions of saturated magnetization of the rare earth element and iron are parallel to each other.

The medium described in U.S. Pat. No. '853 has the following problems. In an exchange-coupled two-layered structure, magnetization process (coercive forces) of the respective layers are greatly changed by the exchange coupling behavior as compared with those of single layers. An inverted magnetic field changed by the two-layered structure is called an apparent coercive force. The apparent coercive force of the low-coercive force layer in the medium described in U.S. Pat. No. '853 is increased, and stability of information in the low-coercive force layer can improved.

However, since the magnetization process of the high-coercive force layer is changed by the exchange coupling behavior of the low-coercive force layer. As a result, the apparent coercive force is decreased as compared with that of the single layer.

Figure 1:
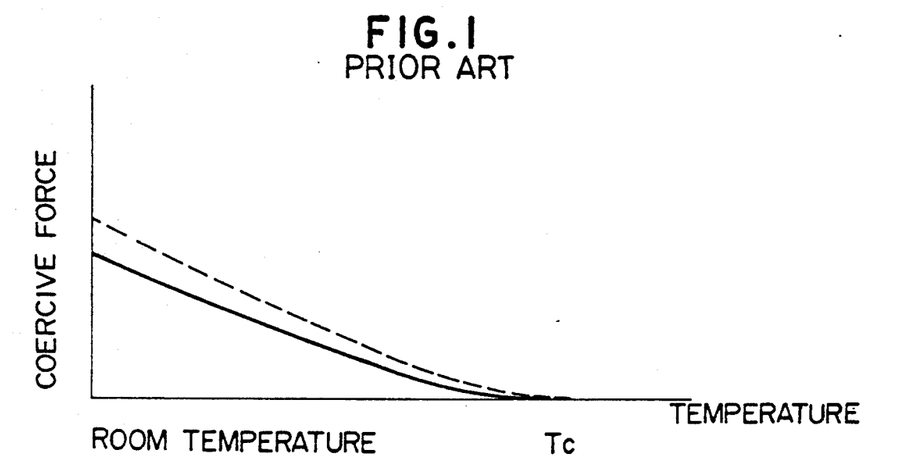
FIG. 1 is a graph showing changes in coercive force of a high-coercive force layer of a conventional opto-magnetic recording medium as a function of temperature.

The above phenomenon is illustrated in FIG. 1. The solid line in FIG. 1 represents a change in apparent coercive force of the high-coercive force layer of the exchange-coupled two-layered medium as a function of temperature. The dotted line in FIG. 1 represents a change in coercive force of only the high-coercive force layer as a function of temperature. As is apparent from the graph in FIG. 1, the apparent coercive force of the high-coercive force layer of the two-layered structure is smaller than that of the single high-coercive force layer. In addition, its temperature change is monotonously decreased toward the Curie point.

Figure 2:
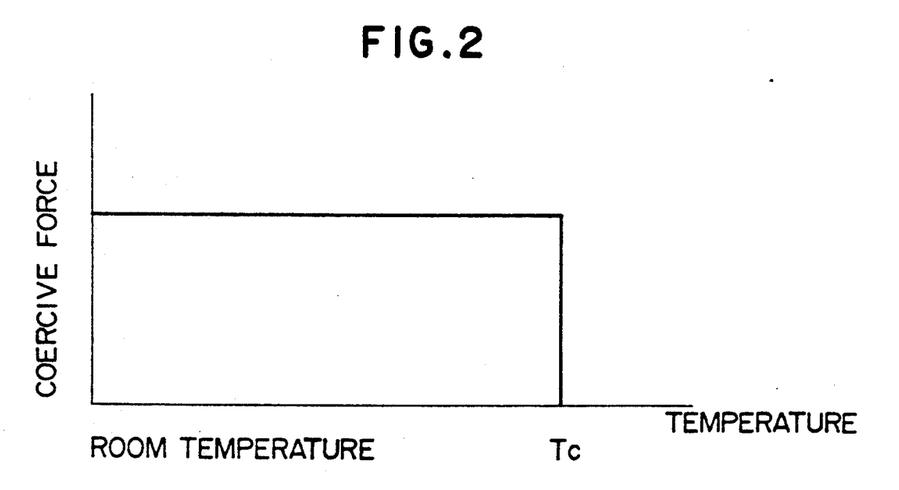
FIG. 2 is a graph showing ideal characteristics of the coercive force of a magnetic layer of an opto-magnetic recording medium.

Ideal characteristics of a magnetic layer of an opto-magnetic recording medium are illustrated in FIG. 2. According to the ideal characteristics, a high coercive force is retained until the curie point Tc because a magnetic domain is kept stable even if a temperature rises due to disturbance except for a recording beam.

Judging from the above conclusion, in the medium described in U.S. Pat. No. '853, the apparent coercive force of the high-coercive force layer is decreased, thus posing a problem on stability of the recorded information.

SUMMARY OF THE INVENTION

It is an object of the present invention to solve the conventional problems described above and to provide an opto-magnetic recording medium wherein recording and readout of information can be easily performed, and recorded information is stabilized.

In order to achieve the above object of the present invention, there is provided an opto-magnetic recording medium comprising a substrate, a first magnetic layer of a Gd-Fe-Co amorphous alloy formed on the substrate and having iron group sublattice magnetization superiority, saturated magnetization of which falls within the range of 25 to 125 emu/cm$^3$, and a second magnetic layer of an R-Fe-Co (wherein R is at least one element selected from the group consisting of Tb and Dy) amorphous alloy having a higher coercive force than that of the first magnetic layer, a lower Curie point than that, and rare earth group sublattice magnetization superiority, saturated magnetization of which falls within the range of 25 to 175 emu/cm$^3$, the second magnetic layer being exchange-coupled with the first magnetic layer.

DETAILED DESCRIPTION OF THE PREFERRED EMBODIMENT

A preferred embodiment of the present invention will be described in detail with reference to the accompanying drawings.

Figure 3:
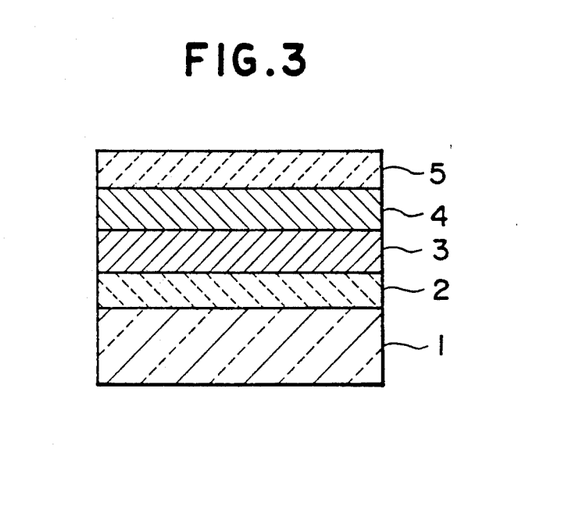
FIG. 3 is a schematic sectional view showing a structure of an opto-magnetic recording medium according to an embodiment of the present invention.

FIG. 3 is a schematic sectional view showing a structure of an opto-magnetic recording medium according to an embodiment of the present invention. A transparent substrate 1 consists of a glass- or plastic material. An underlying layer 2 consisting of a dielectric material such as $Si_3N_4$ is formed on the substrate 1 to enhance an interference effect and prevent corrosion. A first magnetic layer 3 and a second magnetic layer 4 having a higher coercive force and a lower Curie point than those of the first magnetic layer 3 are formed on the underlying layer 2. These magnetic layers are continuously formed during fabrication of the medium in a vacuum and are exchange-coupled. A protective layer 5 consisting of a dielectric material such as $Si_3N_4$ is formed on the second magnetic layer 4 to prevent the magnetic layers from being corroded.

The first magnetic layer consists of a Gd-Fe-Co amorphous alloy having iron group sublattice magnetization superiority, saturated magnetization of which falls within the range of 25 to 125 emu/cm$^3$. The second magnetic layer 4 consists of a Tb-Fe-Co, Dy-Fe-Co, or Tb-Dy-Fe-Co amorphous alloy. The second magnetic layer 4 has rare earth group sublattice superiority so that compensation temperature Tcomp is present between room temperature and the Curie point Tc, and its saturated magnetization falls within the range of 25 to 175 emu/cm$^3$.

It is preferable that the thickness of the first magnetic layer is in a range of 100–1000 Å, than that of the second is in a range of 100–2000 Å and that a total of those of the first and second magnetic layers is in a range of 500–2000 Å. It is further preferable that the thickness of the second magnetic layer is larger than that of the first magnetic layer.

In the medium having a plurality of exchange-coupled magnetic layers, the magnitude of the coercive force of the second magnetic layer determines stability of recorded information. When stability of recorded information is taken into consideration, the coercive force at room temperature and changes in coercive force as a function of temperature must also be taken into consideration due to the following reason. Various heat sources are present in an opto-magnetic drive unit, and the temperature therein is often increased to about 50° to 60° C. In addition, in information read access, the recording medium is irradiated with a laser beam having an intensity low enough not to record information. Under this condition, a slight temperature rise inevitably occurs. Depending on the type of drive unit, read access must be performed while an erasure bias magnetic field is being applied to the medium. Therefore, recorded information must be stable even if the medium temperature is increased upon radiation with a read laser beam while the bias magnetic field is being applied to the medium in the drive unit having a temperature of about 50° to 60° C. The ideal changes in coercive force as a function of temperature in the recording medium which satisfy the above requirements are plotted in FIG. 2. More specifically, the coercive force must be kept large in the range from room temperature to the Curie point Tc at which recording is performed.

Figure 4:
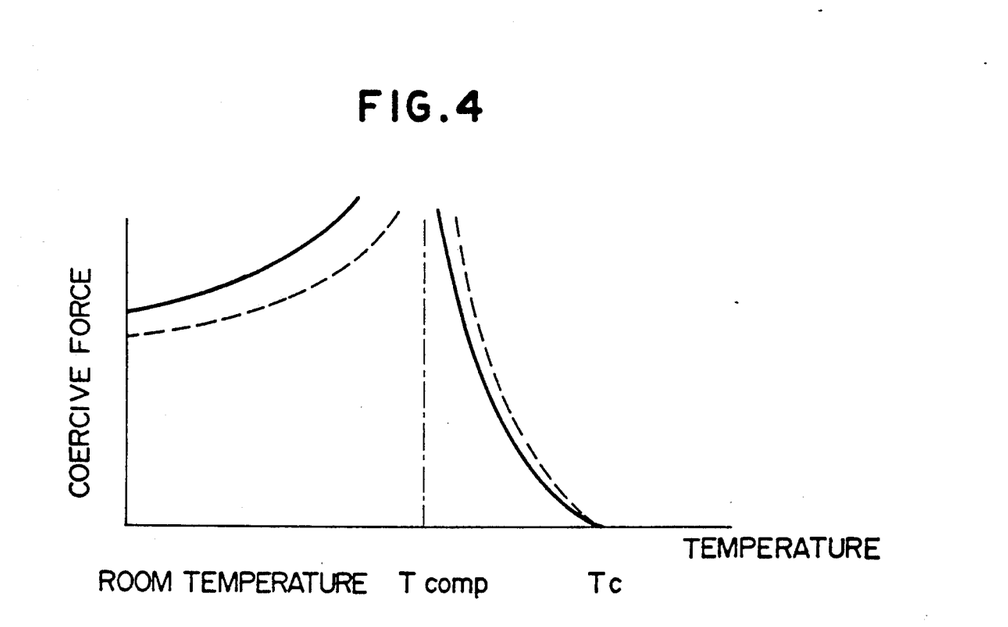
FIG. 4 is a graph showing temperature characteristics of a second magnetic layer of the medium of the present invention.

FIG. 4 is a graph showing temperature characteristics of the coercive force of the second magnetic layer 4 of the present invention. Referring to FIG. 4, the solid lines represent apparent coercive forces obtained by exchange coupling behavior of the first magnetic layer 3, and dotted lines represent coercive forces when the second magnetic layers are formed singly. As is apparent from the graph, the two-layered structure causes an increase in apparent coercive force of the second magnetic layer as compared with the single second magnetic layer between room temperature and the compensation temperature Tcomp. The two-layered structure causes a decrease in apparent coercive force of the second magnetic layer as compared with the single second magnetic layer between the compensation temperature Tcomp and the Curie point Tc because the high-coercive force layer has iron group sublattice magnetization superiority between the compensation temperature Tcomp and the Curie point Tc.

In the medium of the present invention, the apparent coercive force is increased between room temperature and the compensation temperature. However, the apparent coercive force is abruptly decreased between the compensation temperature and the Curie point, thereby obtaining characteristics similar to ideal ones shown in FIG. 2.

In order to form the first and second magnetic layers which satisfy the above requirements, a composition ratio of the rare earth element to an iron group element is changed to satisfy the requirements. If the content of the rare earth element is higher than a compensation component, the resultant medium has rare earth group sublattice magnetization superiority. In this case, the compensation temperature is room temperature or higher. When the rare earth component is increased, the compensation temperature is increased and comes close to the Curie point. However, the content of the rare earth component is excessive, the compensation temperature virtually exceeds the Curie point, resulting in inconvenience.

If a first magnetic layer has rare earth sublattice magnetization superiority in a medium, it is very difficult for this medium to perform recording since the coercive force of the first magnetic layer is increased at about the Curie point of the second magnetic layer at which recording is performed. Therefore, this medium is not suitable as an opto-magnetic recording medium.

Figure 5:
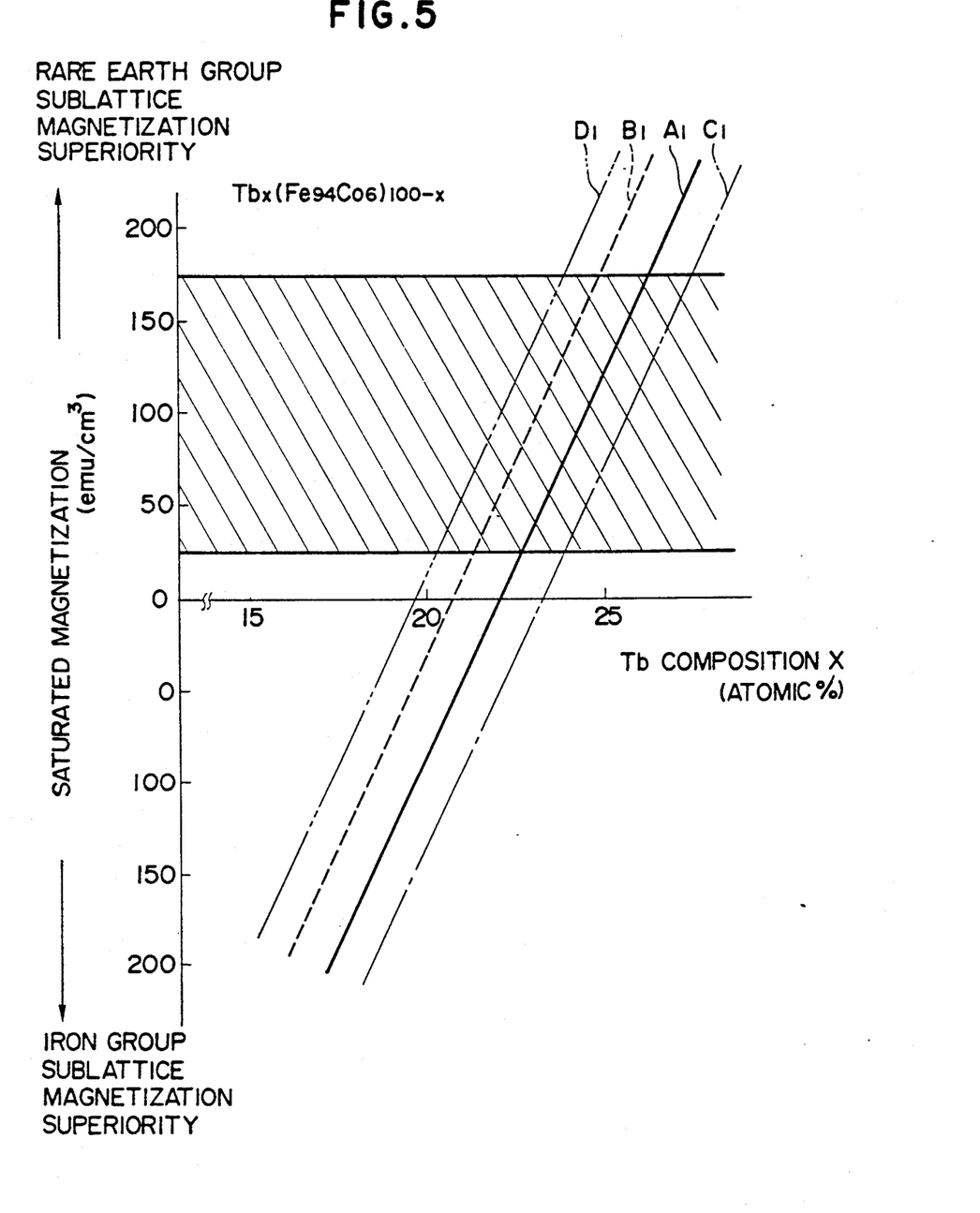
FIGS. 5 to 7 are graphs showing the relationships between rare earth compositions and saturated magnetization of the second magnetic layers of media according to the present invention.

FIG. 5 shows the relationship between the Tb composition X (atomic %) and the saturated magnetization when the second magnetic layer consists of Tb-Fe-Co. A hatched region represents the range of saturated magnetization of the present invention. Lines $A_1$, $B_1$, $C_1$, and $D_1$ represent characteristics obtained according to electron probe microanalysis (EPMA), plasma emission analysis (ICP), a calculation method utilizing a film deposition rate, and fluorescent X-ray analysis (XRF), respectively. Composition ranges vary according to the analysis methods. According to the method utilizing the film deposition rate, the medium according to the present invention can be realized if the Tb composition X falls within the range of 23.8 to 27.6 atomic %. According to the XRF method, the Tb composition X falls within the range of 20.2 to 23.8 atomic %.

Figure 6:
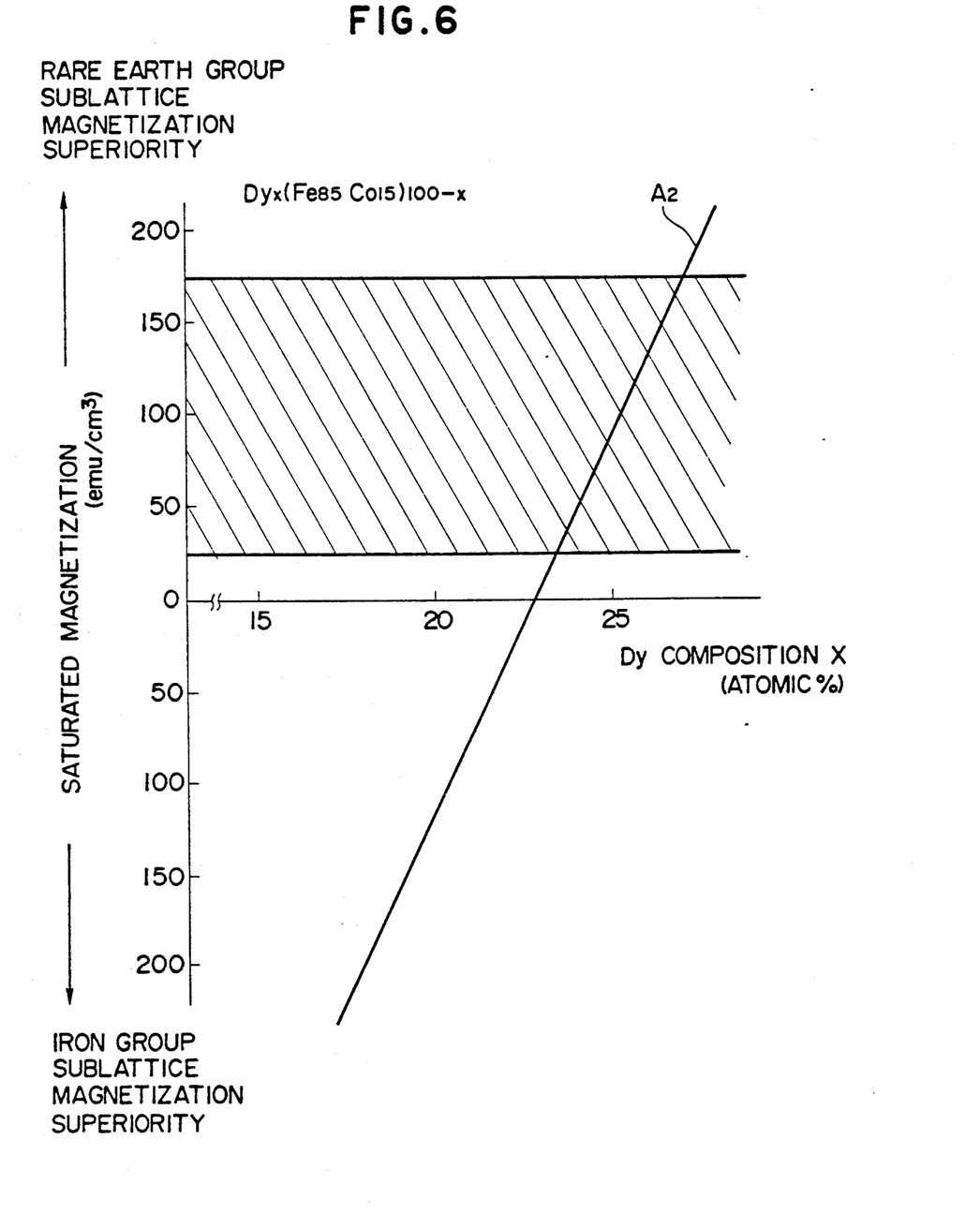

FIG. 6 shows the relationship between the Dy composition X (atomic %) and the saturated magnetization when the second magnetic layer consists of Dy-Fe-Co. A line $A_2$ represents analysis results according to the EPMA method. In order to cause the compensation temperature to fall within the range between room temperature and the Curie point as in the present invention, X falls within the range of 23.4 to 27.0 atomic %.

Figure 7:
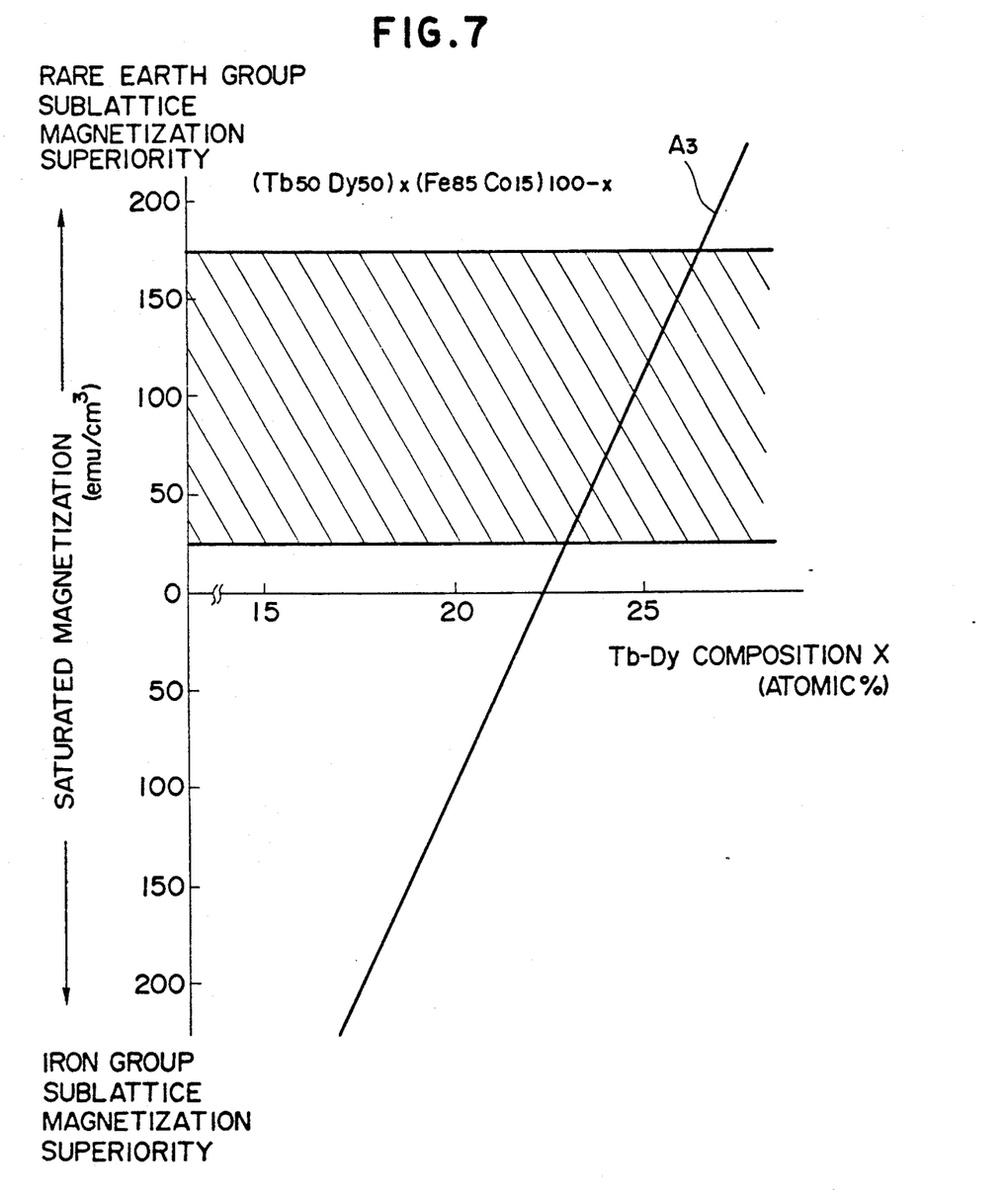

FIG. 7 shows the relationship between the Tb-Dy composition X (atomic %) and the saturated magnetization when the second magnetic layer Tb consists of Dy-Fe-Co. A line $A_3$ represents analysis results according to the EPMA method. In order to cause the compensation temperature to fall within the range between room temperature and the Curie point, X falls within the range of 23.0 to 26.6 atomic %.

Figure 8:
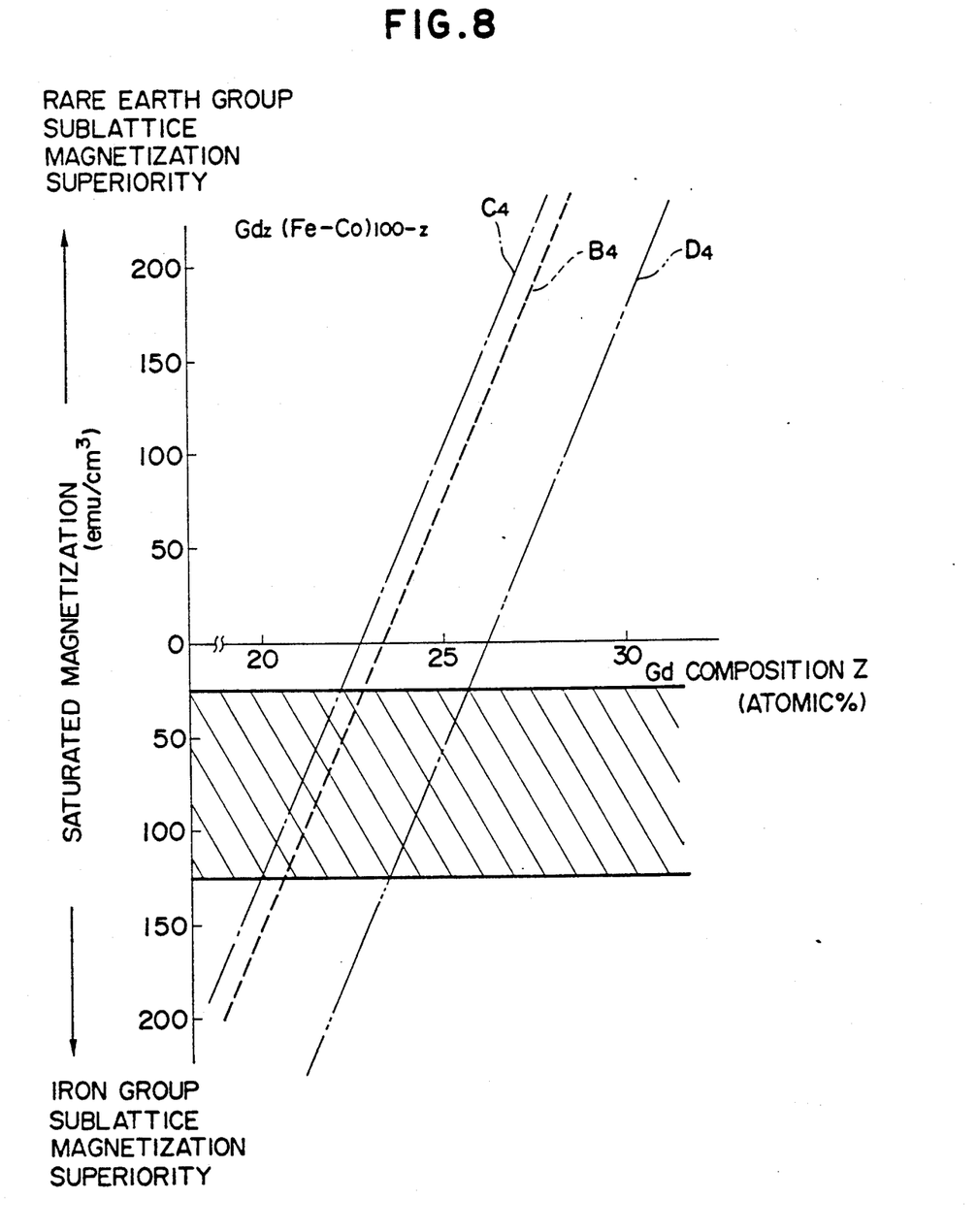
FIG. 8 is a graph showing the relationship between rare earth compositions and saturated magnetization of the first magnetic layer according to the present invention.

FIG. 8 is a graph showing the relationship between the Gd composition Z (atomic %) and the saturated magnetization when the first magnetic layer consists of Gd-Fe-Co. A hatched region represents the range of saturated magnetization which satisfies the requirements of the present invention. Lines $B_4$, $C_4$, and $D_4$ represent analysis results according to the ICP method, the detection method utilizing the film deposition rate, and the XRF method, respectively. For example, according to the detection method utilizing the film deposition rate, the Gd composition Z falls within the range of 20.0 to 22.2 atomic %. According to the XRF method, Z falls within the range of 23.5 to 25.7 atomic %.

Stability of the recorded information primarily depends on the Curie point of the second magnetic layer. The stability of the recorded information is improved when the Curie point is increased. In this case, however, recording sensitivity is degraded. A preferable Curie point of the high-coercive force layer is 100° C. or more, more preferably 130° C. or more, and most preferably 150° C. or more. However, the Curie point should not exceed 190° C.

In order to increase the coercive force, rare earth elements of the second magnetic layer are Tb, Dy, and the like which are held in a non-S state (i.e., elements having a spin angular momentum and an orbital angular momentum of angular momenta). The Curie points of Tb-Fe and Dy-Fe are about 130° C. and about 70° C., respectively. When Co is added to such a material, the Curie point can be arbitrarily controlled.

The Curie points of Tb-($Fe_{100-Y}Co_Y$) and Dy-($Fe_{100-Y'}Co_{Y'}$) can be approximated as follows:
130+6Y (° C.)
70+6Y' (° C.)

Co is added to obtain desired temperatures according to the above relations. In order to set the Curie points within the desirable ranges:

$0 < Y \leq 10$ (atomic %)

$5 \leq Y \leq 20$ (atomic %)

Similarly, in the case of Tb-Dy-($Fe_{100-Y'}Co_{Y'}$), $0 < Y' \leq 15$ (atomic %)

In order to decrease the coercive force, rare earth elements of the low-coercive force layer are Gd and the like which are held in an S-state (an element having only a spin angular momentum). The Curie point of Gd-Fe is about 220° C. When Co is added to Gd-Fe, the Curie point is increased, and the opto-magnetic Kerr rotational angle is increased, thereby improving read characteristics. In Gd-($Fe_{100-W}Co_W$), when W is increased, the iron group magnetic moment is decreased, and perpendicular magnetic anisotropy is degraded. Therefore, W preferably falls within the range of $0 < W \leq 50$.

EXAMPLE 1

A 700-Å thick $Si_3N_4$ film for preventing oxidation and obtaining an interference effect, a 400-Å thick Gd-Fe-Co film as the first magnetic layer, a 400-Å thick Tb-Fe-Co film as the second magnetic layer, and a 700-Å thick $Si_3N_4$ film for preventing oxidation were sequentially formed on a polycarbonate substrate having a pregroove having a diameter of 130 mm by using a magnetron sputtering apparatus in a vacuum, thereby preparing an exchange-coupled two-layered opto-magnetic recording disk. An Ar gas pressure was 0.15 Pa. $Gd_{50}Co_{50}$, Tb, and $Fe_{94}Co_6$ targets were used for forming the magnetic layers. $Gd_{50}Co_{50}$ and $Fe_{94}Co_6$ were used to prepare Gd-Fe-Co, and Tb and $Fe_{94}Co_6$ were used to prepare Tb-Fe-Co. The composition ratio of the rare earth group to the iron group was controlled by power supplied to the of $Gd_{50}Co_{50}$ and $Fe_{94}Co_6$ targets or the Tb and $Fe_{94}Co_6$ targets. The second and first magnetic layers were formed to satisfy the requirements of the present invention.

The range of power was set to be 240 W (DC) (77 Å/min) supplied to the $Gd_{50}Co_{50}$ target for preparing Gd-Fe-Co while the power supplied to the $Fe_{94}Co_6$ target was set to be 280 W (DC) (50 Å/min) or more. Under these conditions, the resultant film had iron group sublattice magnetization superiority. The power supplied to the Tb target for forming Tb-Fe-Co was set to be 150 W (RF) (36 Å/min) while the power supplied to the $Fe_{94}Co_6$ target was set to be 250 W (DC) (46 Å/min) or less. The resultant film had rare earth group sublattice magnetization superiority.

An $Si_3N_4$ film formation rate was about 40 Å/min.

W of the prepared Gd-($Fe_{100-W}Co_W$) film was about 30 atomic %, and a magnetic wall energy density of an interface between the two exchange-coupled layers was about 2 erg/cm². It is thus confirmed that exchange coupling between the two layers is excellent.

The recording/reproducing characteristics of the disk were measured at a position spaced apart by 60 mm from the center of the disk at a speed of 1,500 rpm.

The Gd-Fe-Co layer had iron group sublattice magnetization superiority and its saturated magnetization fell within the range of 25 emu/cm$^3$ to 125 emu/cm$^3$. The Tb-Fe-Co layer had rare earth sublattice magnetization superiority and its saturated magnetization fell within the range of 25 emu/cm$^3$ to 175 emu/cm$^3$. A recording sensitivity was about 7 mW, and a reproduction C/N ratio was about 57 dB, thereby obtaining excellent recording/reproducing characteristics.

The Curie point of the Tb-Fe-Co film constituting the second magnetic layer was about 160° C., and the apparent coercive force at about 100° C. was as high as 3 kOe or more.

The compensation temperature Tcomp varied depending on the magnitudes of saturated magnetization but fell within the range of about 50° to 100° C.

EXAMPLE 2

A 700-Å thick Si$_3$N$_4$ film for preventing oxidation and obtaining an interference effect, a 400-Å thick Gd-Fe-Co film as the first magnetic layer, a 400-Å thick Dy-Fe-Co film as the second magnetic layer, and a 700-Å thick Si$_3$N$_4$ film for preventing oxidation were sequentially formed on a polycarbonate substrate having a pregroove having a diameter of 130 mm by using a magnetron sputtering apparatus in a vacuum, thereby preparing an exchange-coupled two-layered opto-magnetic recording disk. An Ar gas pressure was 0.15 Pa. Gd$_{50}$Co$_{50}$, Dy, and Fe$_{85}$Co$_{15}$ targets were used for forming the magnetic layers. Gd$_{50}$Co$_{50}$ and Fe$_{85}$Co$_{15}$ were used to prepare Gd-Fe-Co, and Dy and Fe$_{85}$Co$_{15}$ were used to prepare Dy-Fe-Co. The composition ratio of the rare earth group to the iron group was controlled by power supplied to the Gd$_{50}$Co$_{50}$ and Fe$_{85}$Co$_{15}$ targets or the Dy and Fe$_{85}$Co$_{15}$ targets. The second and first magnetic layers were formed to satisfy the requirements of the present invention. The range of power was set to be 240 W (DC) (77 Å/min) supplied to the Gd$_{50}$Co$_{50}$ target for preparing Gd-Fe-Co while the power supplied to the Fe$_{85}$Co$_{15}$ target was set to be 280 W (DC) (50 Å/min) or more. Under these conditions, the resultant film had iron group sublattice magnetization superiority. The power supplied to the Dy target for forming Dy-Fe-Co was set to be 160 W (RF) (40 Å/min) while the power supplied to the Fe$_{85}$Co$_{15}$ target was set to be 270 W (DC) (50 Å/min) or less. The resultant film had rare earth group sublattice magnetization superiority.

An Si$_3$N$_4$ film formation rate was about 40 Å/min, and the film formation rate of the magnetic layers was about 100 Å/min.

Z of the prepared Gd-(Fe$_{100-Z}$Co$_Z$) film was about 40 atomic %, and a magnetic wall energy density of an interface between the two exchange-coupled layers was about 2 erg/cm$^2$. It is thus confirmed that exchange coupling between the two layers is excellent.

The recording/reproducing characteristics of the disk were measured at a position spaced apart by 60 mm from the center of the disk at a speed of 1,500 rpm.

The Gd-Fe-Co layer had iron group sublattice magnetization superiority and its saturated magnetization fell within the range of 25 emu/cm$^3$ to 125 emu/cm$^3$. The Dy-Fe-Co layer had rare earth sublattice magnetization superiority and its saturated magnetization fell within the range of 25 emu/cm$^3$ to 175 emu/cm$^3$. A recording sensitivity was about 6.5 mW, and a reproduction C/N ratio was about 58 dB, thereby obtaining excellent recording/reproducing characteristics.

The Curie point of the Dy-Fe-Co film constituting the second magnetic layer was about 150° C., and the apparent coercive force at about 100° C. was as high as 2.5 kOe or more.

The compensation temperature Tcomp varied depending on the magnitudes of saturated magnetization but fell within the range of about 50 to 100° C.

EXAMPLE 3

A 700-Å thick Si$_3$N$_4$ film for preventing oxidation and obtaining an interference effect, a 400-Å thick Gd-Fe-Co film as the first magnetic layer, a 400-Å thick Tb-Dy-Fe-Co film as the second magnetic layer, and a 700-Å thick Si$_3$N$_4$ film for preventing oxidation were sequentially formed on a polycarbonate substrate having a pregroove having a diameter of 130 mm by using a magnetron sputtering apparatus in a vacuum, thereby preparing an exchange-coupled two-layered opto-magnetic recording disk. An Ar gas pressure was 0.15 Pa. Gd$_{50}$Co$_{50}$, Tb$_{50}$Dy$_{50}$, and Fe$_{85}$Co$_{15}$ targets were used for forming the magnetic layers. Gd$_{50}$Co$_{50}$ and Fe$_{85}$Co$_{15}$ were used to prepare Gd-Fe-Co, and Tb$_{50}$Dy$_{50}$ and Fe$_{85}$Co$_{15}$ were used to prepare Tb-Dy-Fe-Co. The composition ratio of the rare earth group to the iron group was controlled by power supplied to the Gd$_{50}$Co$_{50}$ and Fe$_{85}$Co$_{15}$ targets or the Tb$_{50}$Dy$_{50}$ and Fe$_{85}$Co$_{15}$ targets. The second and first magnetic layers were formed to satisfy the requirements of the present invention. The range of power was set to be 240 W (DC) (77 Å/min) supplied to the Gd$_{50}$Co$_{50}$ target for preparing Gd-Fe-Co while the power supplied to the Fe$_{85}$Co$_{15}$ target was set to be 280 W (DC) (50 Å/min) or more. Under these conditions, the resultant film had iron group sublattice magnetization superiority. The power supplied to the Tb$_{50}$Dy$_{50}$ target for forming Tb-Dy-Fe-Co was set to be 150 W (RF) (40 Å/min) while the power supplied to the Fe$_{85}$Co$_{15}$ target was set to be 270 W (DC) (50 Å/min) or less. The resultant film had rare earth group sublattice magnetization superiority.

An Si$_3$N$_4$ film formation rate was about 40 Å/min, and the film formation rate of the magnetic layers was about 100 Å/min.

Z of the prepared Gd-(Fe$_{100-Z}$Co$_Z$) film was about 40 atomic %, and a magnetic wall energy density of an interface between the two exchange-coupled layers was about 2 erg/cm$^2$. It is thus confirmed that exchange coupling between the two layers is excellent.

The recording/reproducing characteristics of the disk were measured at a position spaced apart by 60 mm from the center of the disk at a speed of 1,500 rpm.

The Gd-Fe-Co layer had iron group sublattice magnetization superiority and its saturated magnetization fell within the range of 25 emu/cm$^3$ to 125 emu/cm$^3$. The Tb-Dy-Fe-Co layer had rare earth sublattice magnetization superiority and its saturated magnetization fell within the range of 25 emu/cm$^3$ to 175 emu/cm$^3$. A recording sensitivity was about 7.4 mW, and a reproduction C/N ratio was about 58 dB, thereby obtaining excellent recording/reproducing characteristics.

The Curie point of the Tb-Dy-Fe-Co film constituting the second magnetic layer was about 170° C., and the apparent coercive force at about 100° C. was as high as 3.7 kOe or more.

The compensation temperature Tcomp varied depending on the magnitudes of saturated magnetization but fell within the range of about 50° to 100° C.

COMPARATIVE EXAMPLE 1

Targets as in Example 1 were used to prepare a disk following the procedures as in Example 1 except that power supplied to an $Fe_{94}Co_6$ target for forming a Tb-Fe-Co layer was 250 W (DC) (46 Å/min) or more. A Gd-Fe-Co layer had iron group sublattice magnetization superiority, and its saturated magnetization fell within the range of 25 emu/cm³ to 125 emu/cm3. The Tb-Fe-Co layer had iron group sublattice magnetization priority, and its saturated magnetization fell within the range of 25 emu/cm³ to 125 emu/cm³. Recording/reproduction of the resultant disk was performed. A recording sensitivity was about 6.5 mW, and a reproduction C/N ratio was about 59 dB, thus obtaining excellent recording/reproducing characteristics. However, the apparent coercive force of the Tb-Fe-Co film as the second magnetic layer was as low as 1 kOe or less.

COMPARATIVE EXAMPLE 2

Targets as in Example 1 were used to prepare a disk following the procedures as in Example 1 except that power supplied to an $Fe_{94}Co_6$ target for forming a Gd-Fe-Co layer was 280 W (DC) (50 Å/min) or more. The Gd-Fe-Co layer had rare earth group sublattice magnetization superiority, and its saturated magnetization fell within the range of 10 emu/cm³ to 125 emu/cm³. Recording/reproduction of the resultant disk was performed. A recording sensitivity was about 9 mW, and a reproduction C/N ratio was about 40 to 50 dB. Good recording/reproducing characteristics could not be obtained.

The present invention is not limited to the particular embodiments described above. Various changes and modifications may be made within the spirit and scope of the invention. For example, a metal reflecting layer consisting of Al or the like may be formed on the protective layer of the structure of FIG. 3, or a protective plate may be adhered to the protective layer by an adhesive. In addition, the shape of the medium is not limited to a disk shape but can be replaced with a card- or tape-like shape. All these modifications are included in the present invention without departing the scope of the appended claims.

What is claimed is:

1. An opto-magnetic recording medium, comprising:
    a substrate;
    a first protective layer formed on the substrate;
    a first magnetic layer of a Gd-Fe-Co amorphous alloy film formed on the first protective layer and having iron group sublattice magnetization superiority, and a saturated magnetization falling within a range of 25 to 125 emu/cm³; and
    a second magnetic layer comprising a R-Fe-Co amorphous alloy film (wherein R is at least one element selected from the group consisting of Tb and Dy) formed on the first magnetic layer and having rare earth sublattice magnetization superiority, and a saturated magnetization falling within a range of 25 to 175 emu/cm³, wherein said second magnetic layer has a higher coercive force and a lower Curie temperature than those of said first magnetic layer, said second magnetic layer having a compensation temperature which is higher than 50° C. and lower than the Curie temperature thereof and said second magnetic layer being exchange-coupled with the first magnetic layer; and
    a second protective layer formed on said second magnetic layer.

2. A medium according to claim 1, wherein the Curie point of the second magnetic layer falls within a range of 100° to 190° C.

3. A medium according to claim 1, wherein each of said first and second protective layers is comprised of a dielectric material.

4. A medium according to claim 1, wherein the thickness of the first magnetic layer is in a range of 100 to 1000 Å.

5. A medium according to claim 1, wherein the thickness of the second magnetic layer is in a range of 100 to 2000 Å.

6. A medium according to claim 1, wherein a total of thicknesses of the first and second magnetic layer is in a range of 500 to 2000 Å.

7. A medium according to claim 1, wherein the thicknesses of the second magnetic layer is larger than that of the first magnetic layer.

* * * * *

UNITED STATES PATENT AND TRADEMARK OFFICE
CERTIFICATE OF CORRECTION

PATENT NO. : 5,225,289
DATED : July 6, 1993
INVENTOR(S) : Tadashi Kobayashi

It is certified that error appears in the above-indentified patent and that said Letters Patent is hereby corrected as shown below:

TITLE PAGE

[56] REFERENCES CITED:

FOREIGN PATENT DOCUMENTS:
"0177455 9/1985 Japan" should read
--60-177455 9/1985 Japan--.

"177455 11/1985 Japan" should be deleted.

COLUMN 2:

Line 6, "process" should read --processes--.

COLUMN 9:

Line 9, "125 emu/cm3." should read --125 emu/cm$^3$.--.

COLUMN 10:

Line 9, "and" should be deleted.

Signed and Sealed this

Nineteenth Day of April, 1994

Attest:

BRUCE LEHMAN

Attesting Officer   Commissioner of Patents and Trademarks